E. L. HARTMANN & M. BRAUN.
Lawn-Mower.

No. 222,493. Patented Dec. 9, 1879.

Witnesses:
A. P. Grant
W. F. Kircher

Inventors:
E. L. Hartman
M. Braun
by John A. Wiedersheim,
ATTORNEY

UNITED STATES PATENT OFFICE.

ERNST L. HARTMANN AND MATHIAS BRAUN, OF PHILADELPHIA, PA.

IMPROVEMENT IN LAWN-MOWERS.

Specification forming part of Letters Patent No. 222,493, dated December 9, 1879; application filed September 11, 1879.

*To all whom it may concern:*

Be it known that we, ERNST L. HARTMANN and MATHIAS BRAUN, both of the city and county of Philadelphia, and State of Pennsylvania, have invented a new and useful Improvement in Lawn-Mowers, which improvement is fully set forth in the following specification and accompanying drawings, in which—

Figure 1:
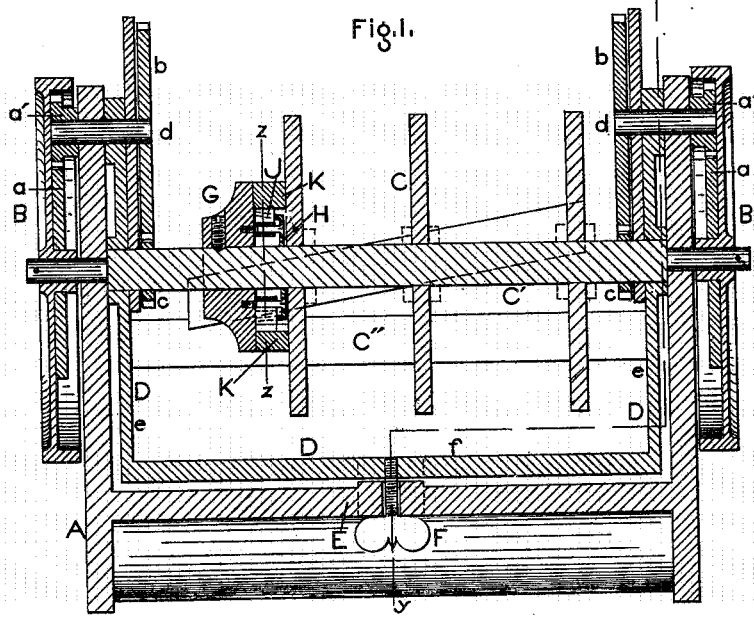
Figure 2:
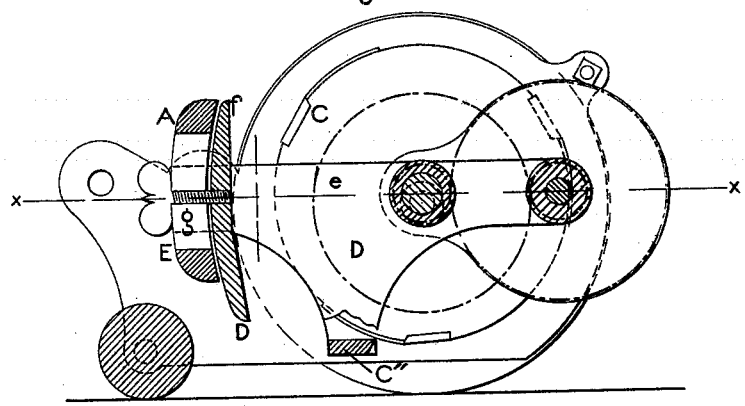
Figure 3:
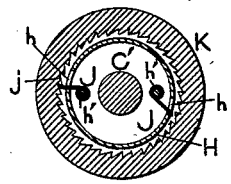
Figure 4:
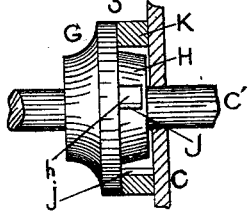

Figure 1 is a horizontal section in line $x\,x$, Fig. 2, of the lawn-mower embodying our invention. Fig. 2 is a vertical section in line $y\,y$, Fig. 1. Fig. 3 is a vertical section in line $z\,z$, Fig. 1. Fig. 4 is a side elevation, partly sectional, of Fig. 3 and connected parts.

Similar letters of reference indicate corresponding parts in the several figures.

Our invention consists of a yoke for adjusting the cut of the mower and permitting the elevation of the knives for sharpening and other purposes.

It also consists of the pawl-and-ratchet mechanism peculiarly constructed, as will be hereinafter set forth.

Referring to the drawings, A represents the frame of a lawn-mower, and B the wheels thereof, which are provided with inclosed gearing $a\,a'$, the power whereof is communicated, by means of gear-wheels $b\,c$, to the rotary cutter C, the wheels $b$ being connected to shafts $d$, which are properly mounted on the frame A, and secured to the gear-wheels $a'$, and the wheels $c$ are fixed to the shaft C′ of the rotary cutter, and gear with the wheels $b$.

The shaft C′ of the cutters C is mounted on a yoke, D, which, consisting of the longitudinal side pieces, $e$, and connected transverse piece $f$, and forming a strong structure, is pivoted to the frame A in such manner that the cutters may be raised and lowered, the axis of the yoke being in the present case the shafts $d$, which pass through the side pieces of the yoke, it being noticed that the gearing $b\,c$, rotary cutter C, and bed-knife C″ are supported on the yoke.

In the cross-piece E of the frame A, adjacent to the transverse piece $f$ of the yoke D, is a vertical slot, $g$, through which is passed a set-screw or screw-bolt, F, fitted to said piece $f$.

It will be seen that by raising or lowering the yoke the knives are moved farther from or nearer to the ground, whereby provision is made for adjusting the cut of the mower or cutting the grass long or short. When the adjustment is accomplished the screw F is tightened, and the parts thereby retain their proper positions.

By releasing the screw the yoke may be raised to full extent, thus disposing the cutters and other parts conveniently for sharpening, repairs, and other purposes.

To the shaft C′ is firmly secured a head, G, from the inner side of which projects a box, H, the periphery of which has openings $h$, through which protrude pawls J, which, limited in motion by the walls of said openings, are hung on posts $h'$, secured to the head and box, and engage with a ratchet, $j$, on the inner face of ring K, which, firmly secured to the outer side of one of the cutter-heads or disks of the rotary cutter C, overhangs the box H.

It will be seen that, as the rotary cutter is mounted loosely on the shaft C′, when the mower is moved forward the pawls J engage with the ratchet $j$, and thus lock the shaft and cutter, whereby the latter is properly rotated or operated for cutting purposes. When the mower is run back the pawls ride freely over the ratchet, and thus the cutter remains inoperative.

As the ring K overhangs the box H, the ratchet-and-pawl mechanism is inclosed, thus being protected from injury and access of dirt, grass, &c.

Having thus described our invention, what we claim as new, and desire to secure by Letters Patent, is—

1. The adjustable yoke D, consisting of the longitudinal side pieces, $e$, and connected transverse piece $f$, in combination with the slotted cross-piece E of the frame A and the set-screw F, substantially as and for the purpose set forth.

2. The combination, with the rotary cutter and its shaft, of the ratchet mechanism, consisting of the overhanging ring K, with ratchet j, and the head G, with box H, having peripheral openings h, the posts h', and hinged pawls J, the latter being hung on said posts h' and projecting through the openings h, the walls whereof limit the play of the pawls, all constructed, combined, and operating substantially as and for the purpose set forth.

MATHIAS BRAUN.
ERNST LOUIS HARTMANN.

Witnesses:
JOHN A. WIEDERSHEIM,
A. P. GRANT.